(12) United States Patent
Asami et al.

(10) Patent No.: US 6,327,138 B1
(45) Date of Patent: Dec. 4, 2001

(54) SOLID ELECTROLYTIC CAPACITOR (75) Inventors: Tadamasa Asami; Katsuhiro Yoshida; Kunihiko Simizu, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/680,913

(22) Filed: Oct. 6, 2000

(30) Foreign Application Priority Data

Oct. 12, 1999 (JP) .................................................. 11-290322

(51) Int. Cl.$^7$ ...................................................... H01G 9/00
(52) U.S. Cl. ............................................... 361/523; 361/525
(58) Field of Search .................................... 361/523, 525, 361/528–529, 532; 252/62.2

(56) References Cited

FOREIGN PATENT DOCUMENTS

| 3-64014 | 3/1991 | (JP) . |
| 6-120086 | 4/1994 | (JP) . |

Primary Examiner—Anthony Dinkins
(74) Attorney, Agent, or Firm—Hutchins, Wheeler & Dittmar (57) ABSTRACT

A solid electrolytic capacitor is made of a first chemical polymer layer having an anode, a cathode, and a dielectric, the cathode being formed first on a surface of the dielectric, and a secondary electrolytic polymer layer formed on a surface of the primary chemical polymer layer by performing electrolytic polymerization in a predetermined solution. This solid electrolytic capacitor includes a secondary electrolytic polymer layer formed by performing electrolytic polymerization in a solution obtained by adding to the predetermined solution a supporting electrolyte having a surface active effect with respect to a solvent in the predetermined solution and a supporting electrolyte having no surface active effect with respect to the solvent in the predetermined solution.

11 Claims, 6 Drawing Sheets

FOURTH EMBODIMENT

EIGHTH EMBODIMENT

001 # SOLID ELECTROLYTIC CAPACITOR

BACKGROUND OF THE INVENTION

1. Field of the Invention

The present invention relates to a method of manufacturing a solid electrolytic capacitor using a conductive polymer such as a polypyrrole-based polymer or polythiophene-based polymer as a supporting electrolyte.

2. Description of the Prior Art

A well-known solid electrolytic capacitor is made of an anode consisting of a valve action metal such as aluminum or tantalum and having a dielectric oxide film formed on its surface and a cathode using a conductive polymer such as a polypyrrole-based polymer or polythiophene-based polymer as a supporting electrolyte.

A solid capacitor using tantalum for an anode is compact and has a large electrostatic capacitance. The characteristics of this capacitor are stable in a wide range from a low temperature to a high temperature. In addition, the capacitor has little voltage dependence and suffers little leakage current.

A conventional method of manufacturing a solid electrolytic capacitor in a case wherein an anode is formed by using tantalum will be described below.

(1) A molded member having a tantalum anode lead buried in tantalum metal powder by press molding is formed, and a porous tantalum element for a solid electrolytic capacitor is obtained by vacuum sintering.

(2) The tantalum element obtained in (1) is dipped in an aqueous phosphoric acid solution (0.6 wt %), and forming is performed by applying a voltage with the tantalum anode lead serving as a positive electrode and the electrode in the aqueous solution serving as a negative electrode.

(3) An insulating (dielectric) oxide film $Ta_2O_5$ is formed on the surface of the tantalum element by forming.

(4) The tantalum element on which the oxide film is formed is dipped in 30 w % of an aqueous iron p-toluenesulfonate solution serving as an oxidant for 5 min. The resultant structure is dried and dipped in ethylenedioxythiophene monomer as a polymerization agent for 1 min. The resultant structure is dried to form a conductive polymer precoat layer inside the porous body of the tantalum element, thereby forming a primary chemical polymer layer.

(5) The tantalum element is dipped in an electrolytic polymerization solution using 0.7 mol/l of pyrrole as a monomer, and a power supply terminal is brought near to the tantalum element having undergone the above chemical polymerization. A conductive polymer layer is then formed on the surface of the element by electrolytic polymerization, thereby forming a secondary electrolytic polymer layer. In this case, the polymerization voltage is set to a standard electrode potential, i.e., 1 V, and the energization time is 20 min.

(6) After the completion of the above electrolytic polymerization, graphite and silver layers are formed on the surface of the tantalum element by paste coating and curing, and a cathode lead is formed on the resultant structure.

(7) The resultant element is packaged by resin molding or the like, thus obtaining a tantalum solid electrolytic capacitor.

As methods of improving the solid electrolytic capacitor obtained by the above manufacturing method, a solid electrolytic capacitor manufacturing method and a solid electrolytic capacitor and manufacturing method therefor are respectively disclosed in Japanese Unexamined Patent Publication Nos. 6-12086 and 3-64014.

According to the solid electrolytic capacitor disclosed in Japanese Unexamined Patent Publication No. 6-12086, in step (5) in which the secondary electrolytic polymer layer is formed, a surfactant is added to the electrolytic polymerization solution to obtain a solid electrolytic capacitor having a small dielectric tangent value and a low equivalent series resistance in a high-frequency range.

According to the solid electrolytic capacitor and manufacturing method therefor disclosed in Japanese Unexamined Patent Publication No. 3-64014, in step (5) described above, the electrostatic capacitance, Tan δ, and the like are improved by adding a surfactant such as an anionic surfactant to the electrolytic polymerization solution for forming the secondary electrolytic polymer layer.

In the solid electrolytic capacitor manufacturing method disclosed in Japanese Unexamined Patent Publication No. 6-12086 and the solid electrolytic capacitor and manufacturing method therefor disclosed in Japanese Unexamined Patent Publication No. 3-64014, it was very difficult to select a surfactant to be added and adjust the concentration of the selected surfactant. When a secondary electrolytic polymer layer is formed by using a supporting electrolyte having a surface active effect, if the concentration of the surfactant added is high, the secondary electrolytic polymer layer peels off, and the electrostatic capacitance of the capacitor decreases. When a secondary electrolytic polymer layer is formed by using a supporting electrolyte having no surface active effect, many projections are formed on the conductive polymer layer, resulting in a poor shape.

Figure 1:
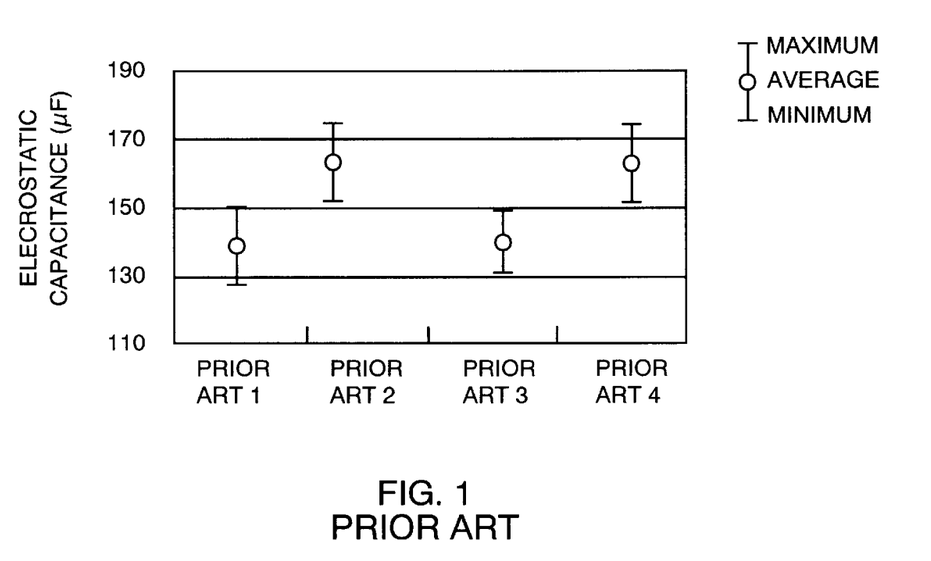
FIG. 1 is a graph showing the electrostatic capacitances of capacitors in prior arts 1 to 4.

FIG. 1 is a graph showing the electrostatic capacitances of capacitors each obtained by adding only one type of surfactant to the electrolytic polymerization solution in step (5) described above. FIG. 2 shows the outer appearance of each secondary electrolytic polymer layer formed by adding one type of surfactant to the electrolytic polymerization solution.

Figure 2A:
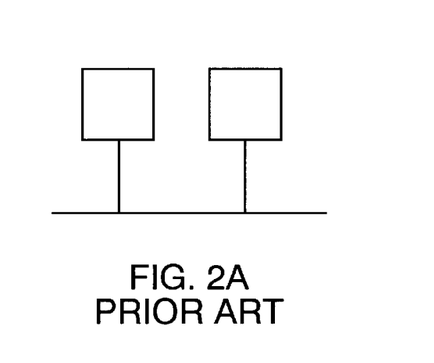

(Prior Art 1): When only sodium dodecylbenzenesulfonate (to be abbreviated to Na-DBS hereinafter) having a surface active effect is added as a supporting electrolyte to the electrolytic polymerization solution, polymerization can be uniformly performed. However, the electrostatic capacitance (1 kHz), which should be about 160 $\mu$F, becomes 143 $\mu$F. That is, the electrostatic capacitance decreases. In this case, the outer appearance does not change.

Figure 2B:
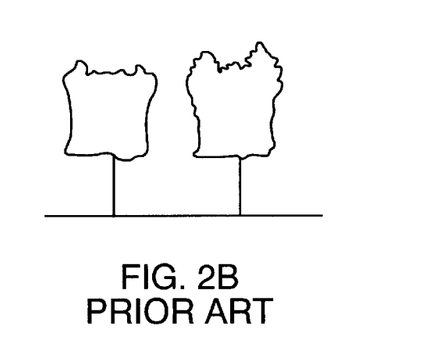

(Prior Art 2): When only sodium p-toluenesulfonate (to be abbreviated to Na-pTS hereinafter) having no surface active effect is added as a supporting electrolyte to the electrolytic polymerization solution, nonuniform projections are formed on the electrolytic polymer layer. As a result, the capacitor has a poor outer appearance. In this case, the electrostatic capacitance (1 kHz) is 165 $\mu$F, and hence does not decrease.

Figure 2C:
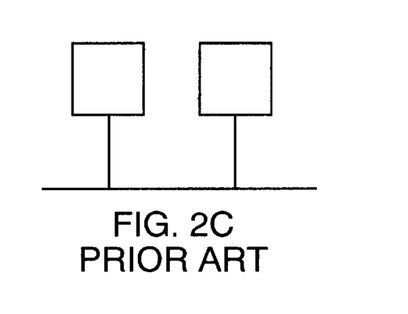

(Prior Art 3): When only sodium butylnaphthalenesulfonate (to be abbreviated to Na-BNS hereinafter) having a surface active effect is added as a supporting electrolyte to the electrolytic polymerization solution, the electrostatic capacitance (1 kHz), which should be about 160 $\mu$F, becomes 141 $\mu$F. That is, the electrostatic capacitance decreases. In this case, the outer appearance does not change.

Figure 2D:
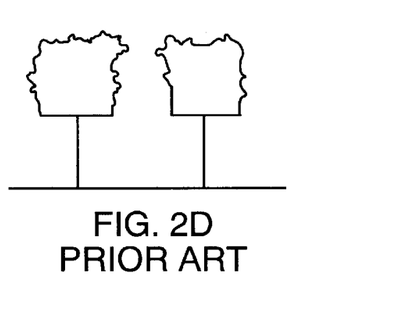

(Prior Art 4): When only sodium naphthalenesulfonate (to be abbreviated to Na-NS hereinafter) having a surface active effect is added as a supporting electrolyte to the electrolytic polymerization solution, nonuniform projections are formed. As a result, the capacitor has a poor outer appearance. The electrostatic capacitance (1 kHz) is 164 $\mu$F, and hence does not decrease.

SUMMARY OF THE INVENTION

The present invention has been made in consideration of the above problems in the prior arts, and has as its object to provide a high-performance solid electrolytic capacitor which allows a reduction in size of the capacitor and prevents a decrease in the electrostatic capacitance of the capacitor by forming a polymer layer in a secondary electrolytic polymerization process to have a good shape.

In order to achieve the above object, according to the main aspect of the present invention, there is provided a solid electrolytic capacitor made of a first chemical polymer layer having an anode, a cathode, and a dielectric, the cathode being formed first on a surface of the dielectric, and a secondary electrolytic polymer layer formed on a surface of the primary chemical polymer layer by performing electrolytic polymerization in a predetermined solution, comprising a secondary electrolytic polymer layer formed by performing electrolytic polymerization in a solution obtained by adding to the predetermined solution a supporting electrolyte having a surface active effect with respect to a solvent in the predetermined solution and a supporting electrolyte having no surface active effect with respect to the solvent in the predetermined solution.

According to the solid electrolytic capacitor described in the main aspect, since no nonuniform projections are formed on a secondary electrolytic polymer layer formed in an electrolytic polymerization process, the secondary electrolytic polymer layer has a good shape, and no peeling occurs in the secondary electrolytic polymer layer. Therefore, the electrostatic capacitance of the capacitor does not decrease.

In addition to the main aspect described above, the present invention has the following sub-aspects.

According to the first sub-aspect, the supporting electrolyte having the surface active effect with respect to the solvent in the predetermined solution comprises at least one type of supporting electrolyte having a surface active effect.

According to the second sub-aspect of the present invention, the supporting electrolyte having no surface active effect with respect to the solvent in the predetermined solution comprises at least one type of supporting electrolyte having no surface active effect.

According to the third sub-aspect of the present invention, the supporting electrolyte having the surface active effect with respect to the solvent in the predetermined solution has a surface active effect equivalent to not less than a critical micelle concentration.

According to the fourth sub-aspect of the present invention, sodium dodecylbenzenesulfonate or sodium butylnaphthalenesulfonate is used as a supporting electrolyte having a surface active effect with respect to the solvent in the predetermined solution.

According to the fifth sub-aspect of the present invention, sodium p-toluenesulfonate or sodium naphthalenesulfonate is used as a supporting electrolyte having no surface active effect with respect to the solvent in the predetermined solution.

According to the solid electrolytic capacitor described in each sub-aspect, the shape of the secondary electrolytic polymer layer is good, and the electrostatic capacitance of the capacitor does not decrease. In addition to these merits, additives can be added in accordance with desired characteristics of the solid electrolytic capacitor.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. (2A)–(2D) are schematic views showing the outer appearances of secondary electrolytic polymer layers in prior arts 1 to 4.

DETAILED DESCRIPTION OF THE PREFERRED EMBODIMENTS

Several preferred embodiments of the present invention will be described below with reference to the accompanying drawings.

Figure 3:
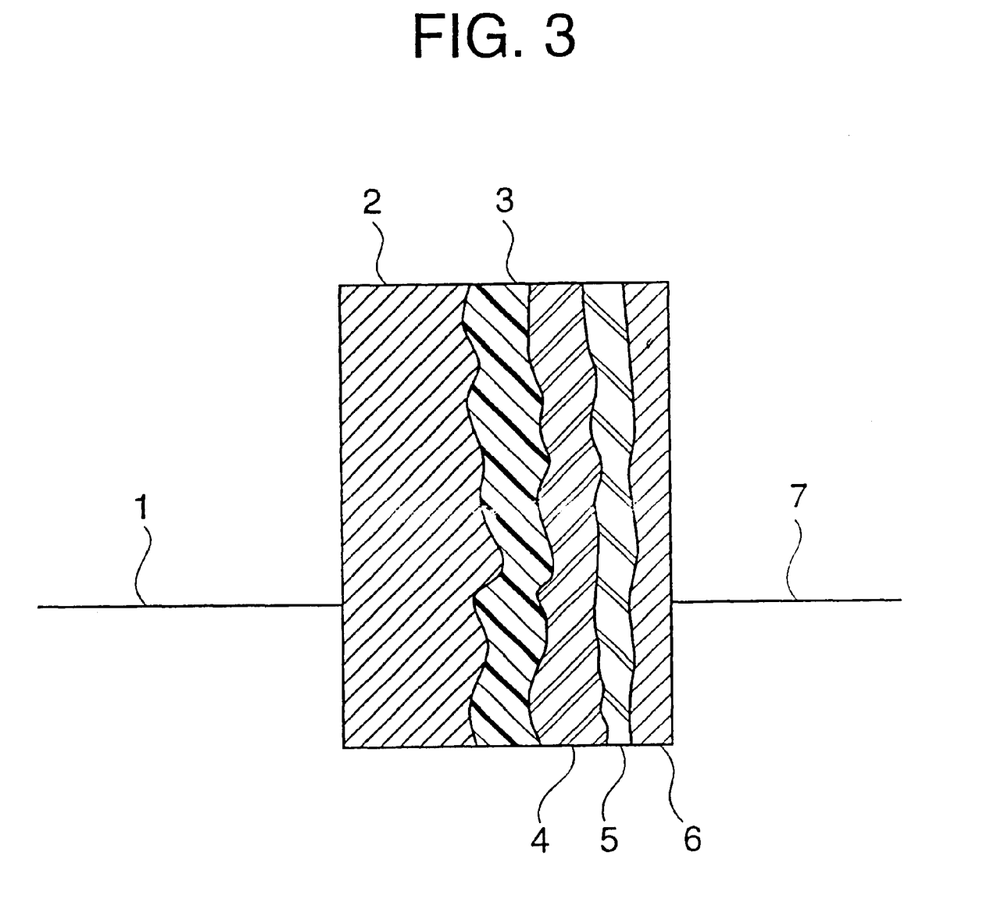
FIG. 3 is a sectional view schematically showing the element structure of a solid electrolytic capacitor of the present invention.

FIG. 3 is a sectional view schematically showing the element structure of a solid electrolytic capacitor according to the present invention. This solid electrolytic capacitor is configured such that a positive terminal is made of an anode lead 1 and anode 2, a negative terminal is made of a cathode lead 7, graphite layer and silver paste 6, secondary electrolytic polymer layer 5, and primary chemical polymer layer 4, and an insulating oxide film 3 is a dielectric.

This solid electrolytic capacitor is characterized in a supporting electrolyte forming the secondary electrolytic polymer layer.

If secondary electrolytic polymerization is performed by using a supporting electrolyte having no surface active effect, since no molecular film is formed between the primary chemical polymer layer 4 and the secondary electrolytic polymer layer 5, charges concentrate on the projections formed on the tantalum oxide film 3 and primary chemical polymer layer 4 during electrolytic polymerization. For this reason, the projections preferentially grow to form the secondary electrolytic polymer layer 5 having many projections.

Since no surface active effect is present, the supporting electrolyte enters portions with weak adsorption between the tantalum oxide film 3 and the primary chemical polymer layer 4 to prevent the primary chemical polymer layer 4 from peeling off. For this reason, the electrostatic capacitance of the capacitor does not decrease.

A supporting electrolyte having a surface active effect forms a molecular film on the interface between the primary chemical polymer layer 4 and the electrolytic polymerization solution and introduces a polymeric monomer into a hydrophobic area to locally increase the concentration of the polymeric monomer. For this reason, the secondary electrolytic polymer layer 5 increasingly tends to grow along the interface between the primary chemical polymer layer 4 and the electrolytic polymerization solution. Even if the primary chemical polymer layer 4 has projections, the secondary electrolytic polymer layer 5 suppresses the growth of projections.

A supporting electrolyte having a surface active effect enters portions where the tantalum oxide film 3 and primary chemical polymer layer 4 weakly adsorb to each other to make the primary chemical polymer layer 4 peel off from the tantalum oxide film 3. For this reason, the coverage of a conductive polymer layer on the tantalum oxide film 3 is reduced, resulting in a decrease in electrostatic capacitance of the capacitor.

According to the present invention, a supporting electrolyte having a surface active effect is mixed into a supporting electrolyte having no surface active effect within a predetermined concentration range, and the mixture is added to the electrolytic polymerization solution. Secondary electrolytic polymerization is then performed by using the resultant solution, thereby forming an electrolytic polymer layer having a good shape by enhancing the characteristics of the two supporting electrolytes. This makes it possible to suppress a decrease in the electrostatic capacitance of the capacitor after electrolytic polymerization.

The steps of manufacturing a solid electrolytic capacitor of the present invention will be described below.

(1) A molded member having the tantalum anode lead 1 buried in tantalum metal powder by press molding is formed, and a porous tantalum element as the anode 2 for a solid electrolytic capacitor is obtained by vacuum sintering.

(2) The tantalum element obtained in (1) is dipped in an aqueous phosphoric acid solution, and forming is performed by applying a voltage with the tantalum anode lead 1 serving as a positive electrode and the electrode in the aqueous solution serving as a negative electrode.

(3) The insulating (dielectric) oxide film 3 is formed on the surface of the tantalum element by forming.

(4) The tantalum element on which the insulating oxide film 3 is formed is dipped in an aqueous oxidant solution. The resultant structure is dried and dipped in a thiophene-based monomer as a polymerization agent for 1 min. The resultant structure is dried to form a conductive polymer precoat layer inside the porous body of the tantalum element, thereby forming the primary chemical polymer layer 4.

(5) The tantalum element is dipped in an electrolytic polymerization solution obtained by adding a surfactant, a supporting electrolyte, a supporting electrolyte having a surface active effect for a solvent used as a dopant of a conductive polymer as well, and a supporting electrolyte having no surface active effect to the solvent at predetermined concentrations. A power supply terminal is then brought near to the tantalum element having undergone the above chemical polymerization. A conductive polymer layer is then formed on the surface of the element by electrolytic polymerization, thereby forming the secondary electrolytic polymer layer 5.

(6) After the completion of the above electrolytic polymerization, the graphite and silver layers 6 are formed on the surface of the tantalum element by paste coating and curing, and the cathode lead 7 is formed on the resultant structure.

(7) The resultant element is packaged in a resin mold or the like, thus obtaining a tantalum solid electrolytic capacitor of the present invention.

First Embodiment:

The first embodiment of the present invention will be described below.

(1) A molded member having a tantalum anode lead buried in tantalum metal powder by press molding was formed, and a porous tantalum element for a solid electrolytic capacitor was obtained by vacuum sintering.

(2) The tantalum element obtained in (1) was dipped in an aqueous phosphoric acid solution (0.6 wt %), and forming was performed by applying a voltage with the tantalum anode lead serving as a positive electrode and the electrode in the aqueous solution serving as a negative electrode.

(3) An insulating (dielectric) oxide film $Ta_2O_5$ was formed on the surface of the tantalum element by forming.

(4) The tantalum element on which the oxide film was formed was dipped in 30 w % of an aqueous iron p-toluenesulfonate solution serving as an oxidant for 5 min. The resultant structure was dried and dipped in ethylene-dioxythiophene monomer as a polymerization agent for 1 min. The resultant structure was dried to form a conductive polymer precoat layer inside the porous body of the tantalum element, thereby forming a primary chemical polymer layer.

(5) The tantalum element was dipped in an electrolytic polymerization solution of an aqueous solvent containing a surfactant, a supporting electrolyte, 0.01 mol/l of Na-DBS also serving as a dopant of a conductive polymer, and 0.5 mol/l of Na-pTS, using 0.7 mol/l of pyrrole as a monomer, and a power supply terminal was brought near to the tantalum element having undergone the above chemical polymerization. A conductive polymer layer was then formed on the surface of the element by electrolytic polymerization, thereby forming a secondary electrolytic polymer layer. In this case, the polymerization voltage was set to a standard electrode potential, i.e., 1 V, and the energization time was 20 min.

(6) After the completion of the above electrolytic polymerization, graphite and silver layers were formed on the surface of the tantalum element by paste coating and curing, and a cathode lead was formed on the resultant structure.

(7) The resultant element was packaged by resin molding or the like, thus obtaining a tantalum solid electrolytic capacitor.

Figure 4:
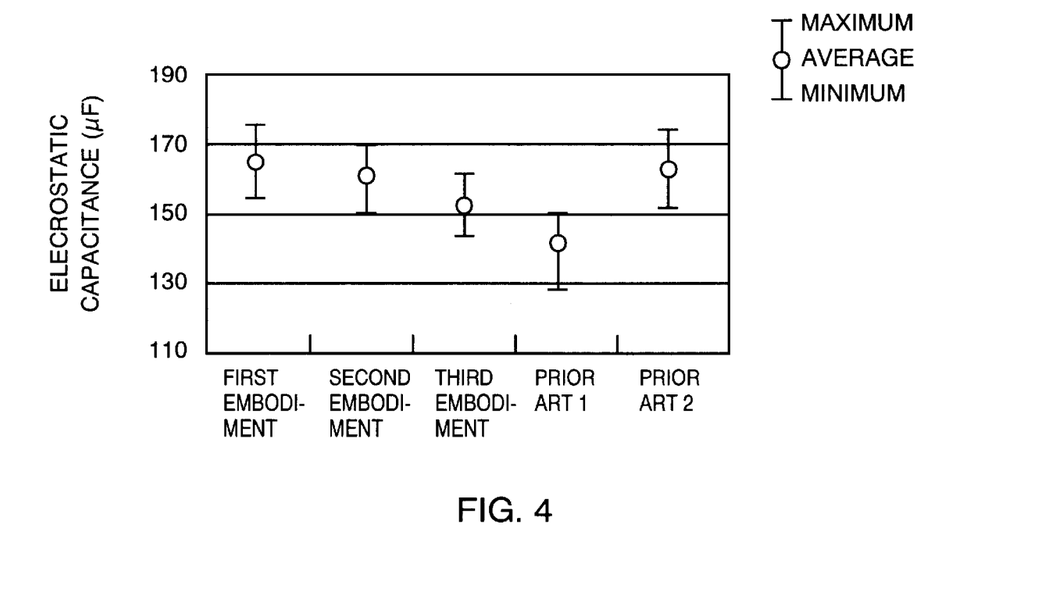
FIGS. 4, 6, 8, and 10 are graphs showing the comparisons between the electrostatic capacitances of capacitors according to the respective embodiments of the present invention and those of prior arts.
Figure 5:
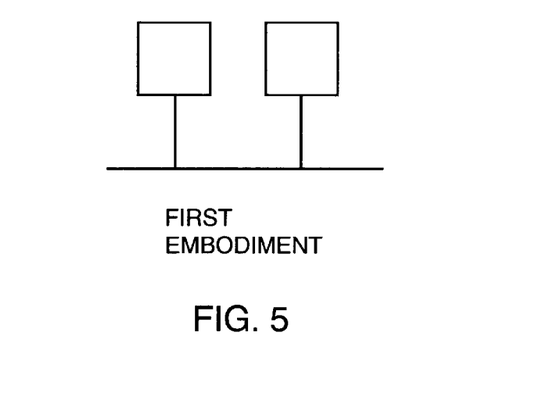
FIGS. 5, 7, 9, and 11 are schematic views showing the outer appearances of the secondary electrolytic polymer layers in the respective embodiments of the present invention.

FIG. 4 shows the comparisons between the capacitor manufactured in the first embodiment and the capacitors obtained in prior arts 1 and 2. FIG. 5 shows the outer appearance of the secondary electrolytic polymer layer formed in the first embodiment.

Prior art 1 is the capacitor having the secondary electrolytic polymer layer formed by using only the above Na-DBS. Prior art 2 is the capacitor having the secondary electrolytic polymer layer formed by using only the Na-pTS having no surface active effect. As is obvious from FIG. 4, the electrostatic capacitance of the capacitor of this embodiment decreases less. As is obvious from FIG. 5, the shape of the secondary electrolytic polymer layer is good.

Second Embodiment:

In the step of forming a secondary electrolytic polymer layer in the element obtained in step (4) in the first embodiment, the tantalum element was dipped in an electrolytic polymerization solution obtained by mixing 0.5 mol/l of Na-pTS as a supporting electrolyte having no surface active effect and 0.03 mol/l of Na-DBS as a supporting electrolyte having a surface active effect, thereby performing electrolytic polymerization in the same manner as in the first embodiment and obtaining a conductive polymer layer according to the second embodiment. FIG. 4 is a graph showing the comparisons between the capacitor manufactured in this embodiment and other capacitors. An illustration of the outer appearance of the secondary electrolytic polymer layer is omitted because it is almost the same as that in the first embodiment. As is obvious from FIG. 4, the electrostatic capacitance does not decrease.

Third Embodiment

In the step of forming a secondary electrolytic polymer layer in the element obtained in step (4) in the first embodiment, the tantalum element was dipped in an electrolytic polymerization solution obtained by mixing 0.5 mol/l of Na-pTS as a supporting electrolyte having no surface active effect and 0.1 mol/l of Na-DBS as a supporting electrolyte having a surface active effect, thereby performing electrolytic polymerization in the same manner as in the first embodiment and obtaining a conductive polymer layer according to the third embodiment. FIG. 4 is a graph showing the comparisons between the capacitor manufactured in this embodiment and other capacitors.

The electrostatic capacitances (1 kHz) of the capacitors of the first and second embodiments are 163 to 164 $\mu$F, whereas the average electrostatic capacitance (1 kHz) of the capacitor in this embodiment 148 $\mu$F. That is, the electrostatic capacitance decreases. As compared with prior art 1, however, a decrease in electrostatic capacitance is suppressed.

As described above, a supporting electrolyte having a surface active effect and a supporting electrolyte having no surface active effect must be added at predetermined concentrations, respectively. According to the system of this embodiment, 0.1 mol/l is the limit of the concentration of Na-DBS.

Fourth Embodiment

Figure 6:
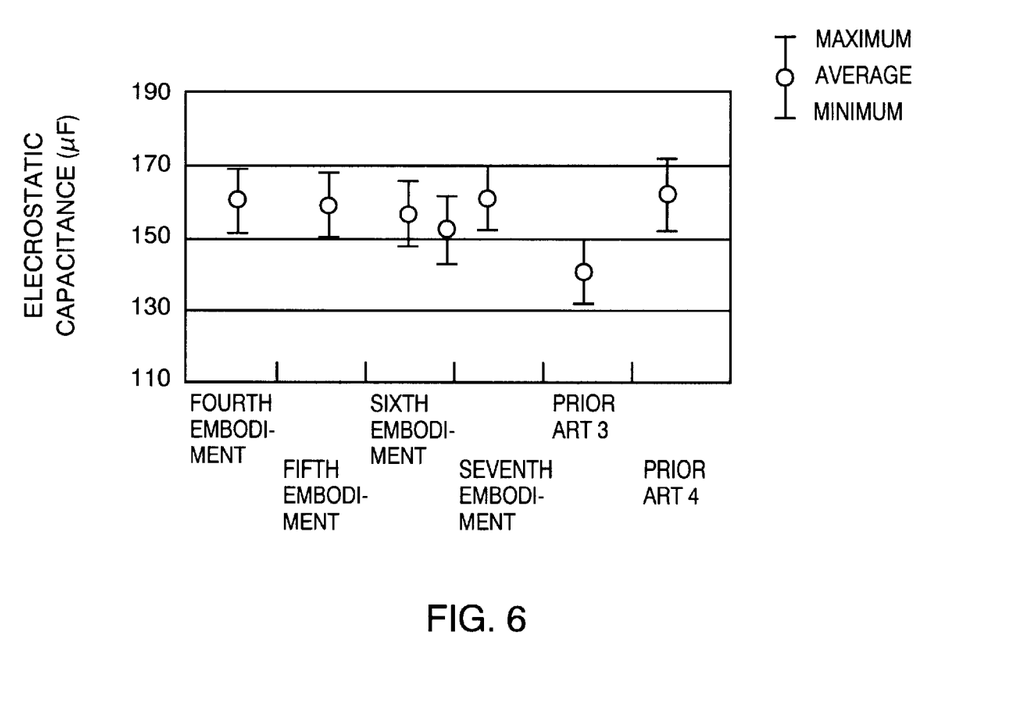
Figure 7:
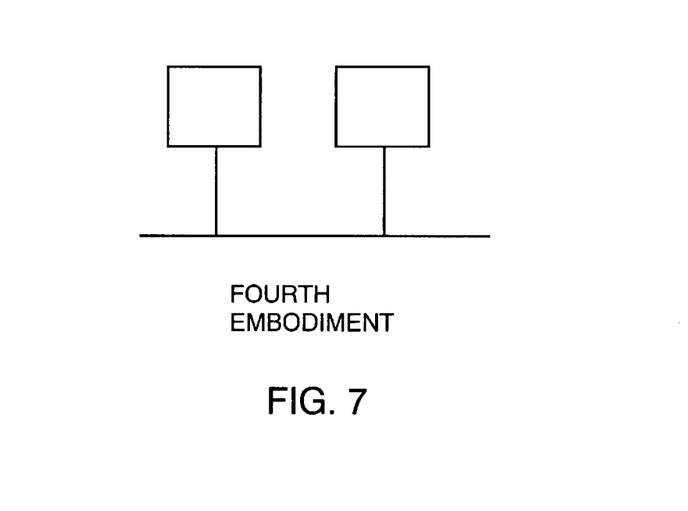

In the step of forming a secondary electrolytic polymer layer in the element obtained in step (4) in the first embodiment, the tantalum element was dipped in an electrolytic polymerization solution obtained by mixing 0.3 mol/l of Na-NS as a supporting electrolyte having no surface active effect and 0.01 mol/l of Na-DBS as a supporting electrolyte having a surface active effect, thereby performing electrolytic polymerization in the same manner as in the first embodiment and obtaining a conductive polymer layer. FIG. 6 shows the comparisons between the electrostatic capacitance of the capacitor obtained in the fourth embodiment and the electrostatic capacitances of the capacitors obtained in prior arts 3 and 5. FIG. 7 shows the outer appearance of the secondary electrolytic polymer layer formed in the fourth embodiment.

Prior art 3 uses only the above Na-DBS. Prior art 4 uses only the above Na-NS. As is obvious from FIG. 6, in the capacitor of the fourth embodiment, the electrostatic capacitance decreases less than that in the capacitor in prior art 4. As is obvious from FIG. 7, the shape of the secondary electrolytic polymer layer is good. That is, the same effects as described above can be obtained by using Na-BNS having the same surface active effect instead of Na-DBS.

Fifth Embodiment

In the step of forming a secondary electrolytic polymer layer in the element obtained in step (4) in the first embodiment, the tantalum element was dipped in an electrolytic polymerization solution obtained by mixing 0.3 mol/l of Na-NS as a supporting electrolyte having no surface active effect and 0.05 mol/l of Na-DBS as a supporting electrolyte having a surface active effect, thereby performing electrolytic polymerization in the same manner as in the first embodiment and obtaining a conductive polymer layer. FIG. 6 is a graph showing the comparisons between the electrostatic capacitance of the capacitor manufactured in the fifth embodiment and the electrostatic capacitances of other capacitors. An illustration of the outer appearance of the secondary electrolytic polymer layer is omitted because it is almost identical to that in the fourth embodiment. As is obvious from FIG. 6, the electrostatic capacitance of the fifth embodiment of the present invention does not decrease.

Sixth Embodiment

In the step of forming a secondary electrolytic polymer layer in the element obtained in step (4) in the first embodiment, the tantalum element was dipped in an electrolytic polymerization solution obtained by mixing 0.3 mol/l of Na-NS as a supporting electrolyte having no surface active effect and 0.10 mol/l of Na-DBS as a supporting electrolyte having a surface active effect, thereby performing electrolytic polymerization in the same manner as in the first embodiment and obtaining a conductive polymer layer. FIG. 6 is a graph showing the comparisons between the electrostatic capacitance of the capacitor manufactured in the sixth embodiment and the electrostatic capacitances of other capacitors. An illustration of the outer appearance of the obtained secondary electrolytic polymer layer is omitted because it is almost identical to that in the fourth embodiment. As is obvious from FIG. 6, the electrostatic capacitance of the capacitor of this embodiment decreases as compared with the fourth and fifth embodiments, but a decrease in electrostatic capacitance is suppressed as compared with prior art 3.

As described in the fifth and sixth embodiments, a supporting electrolyte having a surface active effect and a supporting electrolyte having no surface active effect must be added at predetermined concentrations, respectively. As in this embodiment, even when Na-NS is used in place of Na-pTS having no surface active effect, 0.1 mol/l is the limit of the concentration of Na-DBS according to the system used in this embodiment.

Seventh Embodiment

In the step of forming a secondary electrolytic polymer layer in the element obtained in step (4) in the first embodiment, the tantalum element was dipped in an electrolytic polymerization solution using a mixture of 0.2 mol/l of Na-pTS and 0.3 mol/l Na-NS as supporting electrolytes having no surface active effect and 0.03 mol/l of Na-DBS as a supporting electrolyte having a surface active effect, thereby performing electrolytic polymerization in the same manner as in the first embodiment and obtaining a conductive polymer layer. FIG. 6 is a graph showing the comparisons between the electrostatic capacitance of the capacitor manufactured in the seventh embodiment and the electrostatic capacitances of other capacitors. An illustration of the outer appearance of the secondary electrolytic polymer layer is omitted because it is almost identical to that in the fourth embodiment. As is obvious from FIG. 6, in the seventh embodiment, almost the same electrostatic capacitance as that in the fourth embodiment was obtained.

Eighth Embodiment

In the step of forming a secondary electrolytic polymer layer in the element obtained in step (4) in the first embodiment, the tantalum element was dipped in an electrolytic polymerization solution using 0.5 mol/l of Na-pTS as a supporting electrolyte having no surface active effect and a mixture of 0.03 mol/l of Na-DBS and 0.03 mol/l of Na-BNS as supporting electrolytes having a surface active effect, thereby performing electrolytic polymerization in the same manner as in the first embodiment and obtaining a conductive polymer layer.

Ninth Embodiment

In the step of forming a secondary electrolytic polymer layer in the element obtained in step (4) in the first embodiment, the tantalum element was dipped in an electrolytic polymerization solution using 0.5 mol/l of Na-pTS as a supporting electrolyte having no surface active effect and a mixture of 0.03 mol/l of Na-DBS and 0.05 mol/l Na-BNS as supporting electrolytes having a surface active effect, thereby performing electrolytic polymerization in the same manner as in the first embodiment and obtaining a conductive polymer layer.

Figure 8:
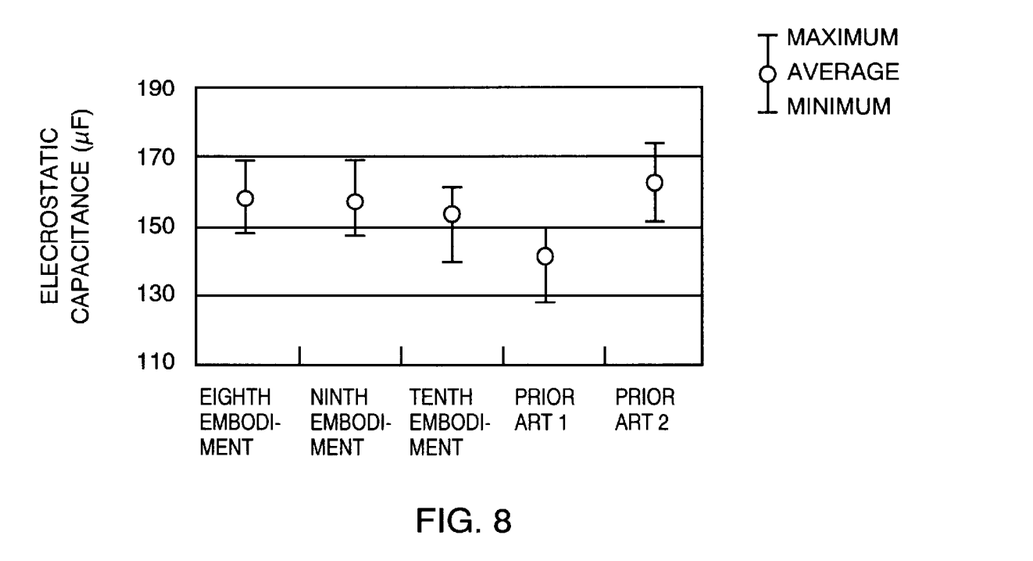
Figure 9:
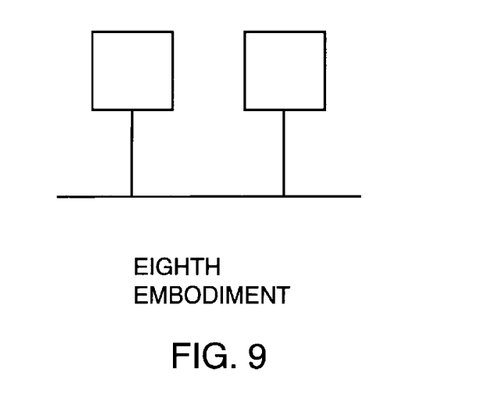

FIG. 8 is a graph showing the comparisons between the electrostatic capacitances of the capacitors manufactured in the eighth and ninth embodiments. FIG. 9 shows the outer appearance of the secondary electrolytic polymer layer obtained in the eighth embodiment. An illustration of the outer appearance of the secondary electrolytic polymer layer in the ninth embodiment is omitted because it is almost identical to that in the eighth embodiment.

As is obvious from FIG. 8, the electrostatic capacitance of each of the capacitors obtained in the eighth and ninth embodiments was almost the same as that of prior art 2. As is obvious from FIG. 9, a good outer appearance was obtained.

10th Embodiment

In the step of forming a secondary electrolytic polymer layer in the element obtained in step (4) in the first embodiment, the tantalum element was dipped in an electrolytic polymerization solution obtained by mixing 0.25 mol/l of Na-pTS and 0.15 mol/l Na-NS as supporting electrolytes having no surface active effect and 0.03 mol/l of Na-DBS and 0.05 mol/l of Na-BNS as supporting electrolytes having a surface active effect, thereby performing electrolytic polymerization in the same manner as in the first embodiment and obtaining a conductive polymer layer. FIG. 8 shows the electrostatic capacitance of the capacitor manufactured in the 10th embodiment. An illustration of the outer appearance of the obtained secondary electrolytic polymer layer is omitted because it is almost identical to that in the eighth embodiment. As shown in FIG. 8, the electrostatic capacitance (1 kHz) of the capacitor of the 10th embodiment was 156 $\mu$F. This electrostatic capacitance value was almost the same as in prior art 2, and did not decrease unlike in prior arts 1 and 3 shown in FIG. 1.

Even when an electrolytic polymerization solution obtained by mixing two or more types of supporting electrolytes having a surface active effect and two or more types of supporting electrolytes having no surface active effect was used, a capacitor in which the outer appearance of the secondary electrolytic polymer layer was good and no decrease in electrostatic capacitance occurred was obtained.

As is also obvious from the result in the third embodiment, the sum of the concentrations of supporting electrolytes having a surface active effect which are to be added to an electrolytic polymerization solution must be adjusted to about 0.1 mol/l.

11th Embodiment

Figure 10:
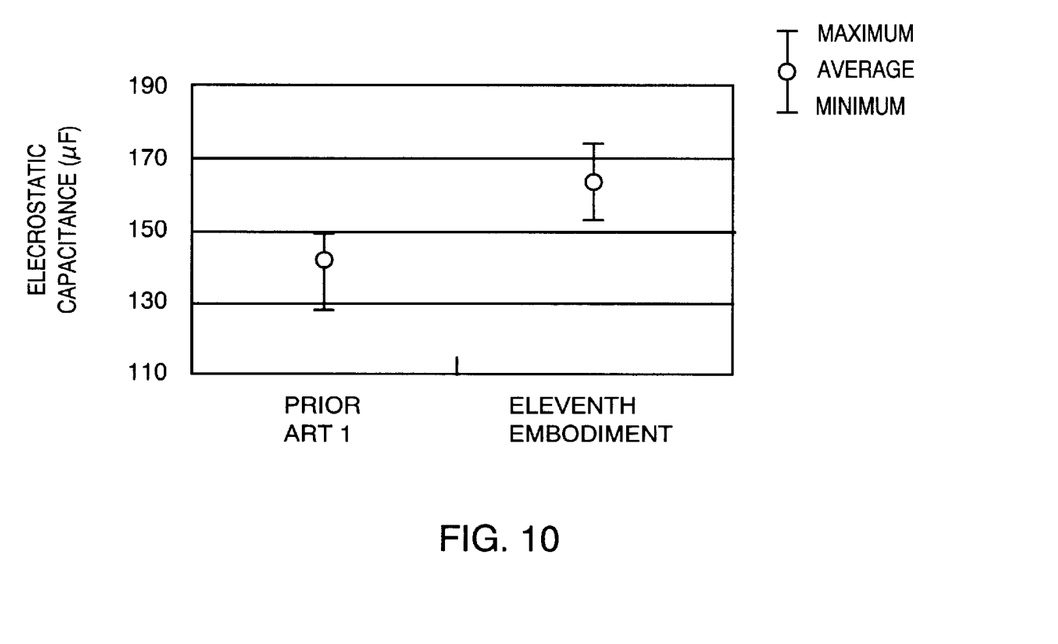
Figure 11:
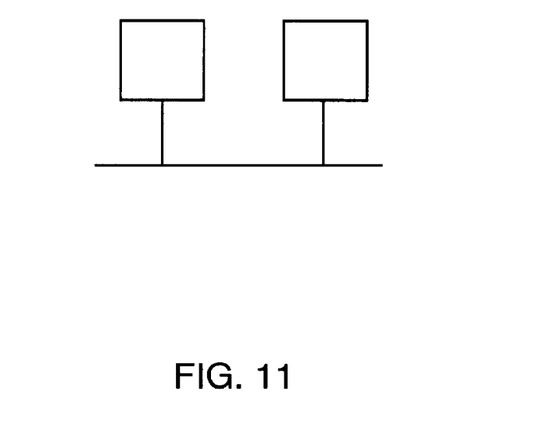

In the step of forming a secondary electrolytic polymer layer in the element obtained in step (4) in the first embodiment, thiophene (0.35 mol/l) was used as a monomer in place of pyrrole. Since thiophene was not easily dissolved in water, a mixture (50 wt % each) of water and acetinitrile was used as a solvent. The tantalum element was dipped in an electrolytic polymerization solution obtained by adding 0.015 mol/l of Na-DBS as a supporting electrolyte having a surface active effect and 0.25 mol/l of Na-pTS as a supporting electrolyte having no surface active effect to this mixed solvent, thereby performing electrolytic polymerization in the same manner as in the first embodiment and obtaining a conductive polymer layer. FIG. 10 is a graph showing the comparisons between the electrostatic capacitance of the capacitor manufactured in this embodiment and the electrostatic capacitance of the prior art 1. FIG. 11 shows the outer appearance of the secondary electrolytic polymer layer obtained in the 11th embodiment. As shown in FIG. 10, the electrostatic capacitance (1 kHz) is 161 $\mu$F, which was almost equal to that in the first embodiment. In addition, as shown in FIG. 11, the outer appearance of the secondary electrolytic polymer layer was good.

In this embodiment, tantalum is used as an anode material. However, aluminum is often used for solid electrolytic capacitors. According to the present invention, the same effects as described can be obtained even if aluminum is used as an anode material. In addition, the same effects as described above can be obtained even if a metal other than a valve action metal is used as an anode material.

Furthermore, the same effects as described can be obtained by using a polypyrrole-based solution or polythiophene-based solution, other than the pyrrole used in the embodiments, as a monomer in a secondary electrolytic polymer layer solution.

What is claimed is:

1. A solid electrolytic capacitor made of a first chemical polymer layer having an anode, a cathode, and a dielectric, the cathode being formed first on a surface of the dielectric, and a secondary electrolytic polymer layer formed on a surface of the primary chemical polymer layer by performing electrolytic polymerization in a predetermined solution, comprising a secondary electrolytic polymer layer formed by performing electrolytic polymerization in a solution obtained by adding to the predetermined solution a supporting electrolyte having a surface active effect with respect to a solvent in the predetermined solution and a supporting electrolyte having no surface active effect with respect to the solvent in the predetermined solution.

2. A capacitor according to claim 1, wherein the supporting electrolyte having the surface active effect with respect to the solvent in the predetermined solution comprises at least one type of supporting electrolyte having a surface active effect.

3. A capacitor according to claim 1, wherein the supporting electrolyte having no surface active effect with respect to the solvent in the predetermined solution comprises at least one type of supporting electrolyte having no surface active effect.

4. A capacitor according to claim 1, wherein the supporting electrolyte having the surface active effect with respect to the solvent in the predetermined solution has a surface active effect equivalent to not less than a critical micelle concentration.

5. A capacitor according to claim 2, wherein the supporting electrolyte having the surface active effect with respect to the solvent in the predetermined solution has a surface active effect equivalent to not less than a critical micelle concentration.

6. A capacitor according to claim 2, wherein sodium dodecylbenzenesulfonate is used as a supporting electrolyte having a surface active effect with respect to the solvent in the predetermined solution.

7. A capacitor according to claim 4, wherein sodium dodecylbenzenesulfonate is used as a supporting electrolyte having a surface active effect with respect to the solvent in the predetermined solution.

8. A capacitor according to claim 2, wherein sodium butylnaphthalenesulfonate is used as a supporting electrolyte having a surface active effect with respect to the solvent in the predetermined solution.

9. A capacitor according to claim 4, wherein sodium butylnaphthalenesulfonate is used as a supporting electrolyte having a surface active effect with respect to the solvent in the predetermined solution.

10. A capacitor according to claim 3, wherein sodium p-toluenesulfonate is used as a supporting electrolyte having no surface active effect with respect to the solvent in the predetermined solution.

11. A capacitor according to claim 3, wherein sodium naphthalenesulfonate is used as a supporting electrolyte having no surface active effect with respect to the solvent in the predetermined solution.

\* \* \* \* \*